United States Patent [19]

Kitamura et al.

[11] Patent Number: 5,714,030
[45] Date of Patent: Feb. 3, 1998

[54] PLASTISOL TYPE ADHESIVE COMPOSITION USED IN FILTER FOR ALCOHOL-CONTAINING FUEL

[75] Inventors: Iwao Kitamura; Susumu Matsumoto; Norihisa Miyajima, all of Urawa; Takayuki Ichihara, Higashimurayama; Seiichiro Hashimoto, Ageo; Junko Yamakawa, Kitakatsushika-gun, all of Japan

[73] Assignee: Tsuchiya Mfg. Co., Ltd., Tokyo, Japan

[21] Appl. No.: 777,005

[22] Filed: Jan. 3, 1997

Related U.S. Application Data

[60] Continuation of Ser. No. 539,837, Oct. 6, 1995, abandoned, which is a division of Ser. No. 159,869, Dec. 1, 1993, abandoned.

[30] Foreign Application Priority Data

Dec. 7, 1992 [JP] Japan ............................ 4-351286

[51] Int. Cl.$^6$ ............................ C08J 161/06; C08J 163/00; B01D 27/06; C08L 61/06
[52] U.S. Cl. ................. 156/335; 156/330; 210/493.2; 523/455; 523/457; 524/296; 524/297; 524/427; 524/433; 524/445; 524/451; 524/423; 524/436; 524/508; 524/509; 524/569
[58] Field of Search ............................ 156/330, 335; 210/493.2; 523/455, 457; 524/296, 297, 423, 427, 433, 436, 445, 451, 508, 509, 569

[56] References Cited

U.S. PATENT DOCUMENTS

| | | | |
|---|---|---|---|
| 3,164,506 | 1/1965 | Lake | 210/493.2 |
| 3,306,794 | 2/1967 | Humbert, Jr. | 210/493 |
| 3,383,337 | 5/1968 | Garling | 524/297 |
| 3,562,191 | 2/1971 | Giessler | 524/314 |
| 3,565,836 | 2/1971 | Fuller | 524/509 |
| 4,268,548 | 5/1981 | Burba et al. | 524/190 |
| 4,388,363 | 6/1983 | Fountain | 428/215 |
| 4,482,664 | 11/1984 | Blum et al. | 524/569 |
| 4,525,234 | 6/1985 | Harold et al. | 524/297 |
| 5,093,768 | 3/1992 | Gerace et al. | 524/569 |
| 5,130,200 | 7/1992 | Huynh-Tran | 523/455 |

FOREIGN PATENT DOCUMENTS

| | | | |
|---|---|---|---|
| 0701335 | 1/1965 | Canada | 210/493.2 |
| 28 34 411 | 2/1979 | Germany | 524/296 |
| 2834311 | 2/1979 | Germany | 524/296 |
| 02 71 908 | 9/1989 | Germany | 523/455 |
| 0129252 | 5/1990 | Japan | 524/509 |
| 2-129252 | 5/1990 | Japan | 524/509 |
| 1147726 | 3/1985 | U.S.S.R. | 523/455 |

OTHER PUBLICATIONS

T. Ichihara et al., "Development Of A PVC Adhesive For Fuel Filters Compatible With Methanol Fuels", SAE Technical Paper Series, presented at the Int'l Congress and Exposition, Detroit, Michigan, Mar. 1–5, 1993, pp. 1–13.

*Primary Examiner*—Peter A. Szekely
*Attorney, Agent, or Firm*—Foley & Lardner

[57] ABSTRACT

A plastisol type adhesive composition used to bond a filer paper and end caps of an filter element of a fuel filter for filtering a mixture fuel of gasoline and methanol. The adhesive composition comprises a polymer (vinyl chloride polymer and/or copolymer) in an amount of 100 parts by weight, a filler in an amount ranging from 50 to 250 parts by weight, a plasticizer in an amount ranging from 50 to 250 parts by weight, and phenolic resin as an adhesiveness providing agent, in an amount ranging from 0.5 to 20 parts by weight.

18 Claims, 1 Drawing Sheet

PLASTISOL TYPE ADHESIVE COMPOSITION USED IN FILTER FOR ALCOHOL-CONTAINING FUEL

This application is a continuation of application Ser. No. 08/539,837, filed Oct. 6, 1995, now abandoned which is a Rule 60 divisional of Ser. No. 08/159,869, filed on Dec. 1, 1993 now abandoned.

BACKGROUND OF THE INVENTION

1. Field of the Invention

This invention relates to improvements in an adhesive used for a filter for filtering an alcohol-containing fuel, and more particularly to a vinyl chloride plastisol type adhesive composition which is high in durability under dipping in the alcohol-containing fuel.

2. Description of the Prior Art.

A variety of filters for filtering fuel (light oil or gasoline) of an internal combustion engine have been proposed and put into practical use. Typical one of them includes a filter element which is produced by forming a pleated filter paper into a cylindrical shape. Disc-shaped end plates are bonded respectively to the opposite ends of the cylindrical pleated filter paper with an adhesive in a manner to maintain a liquid (fuel) tight seal. As the adhesive, one prepared by combining epoxy resin and a hardener of amine or amide is usually employed for the sake of having a high fuel resistance.

A fuel filter using the above epoxy adhesive is sufficiently durable in practice under a condition to be dipped in gasoline or light oil for a long time. However, from the viewpoint of preventing air pollution due to exhaust gas upon incomplete combustion, using a methanol-containing fuel has been recently proposed and put into practical use. In this case, the epoxy resin adhesive loses its adhesiveness or adhesive strength with lapse of time and finally peels off from the filter paper and/or the end plate. Additionally, even if a general vinyl chloride plastisol type adhesive is used in place of the above epoxy resin-based adhesive, it unavoidably peels off with lapse of time so as to be brought into a condition not to function. In view of the above, studies have been made to obtain an adhesive resisting to the methanol-containing fuel; however, no such an adhesive has been developed.

SUMMARY OF THE INVENTION

It is an object of the present invention to provide an improved plastisol type adhesive composition to be used in a filter for an alcohol-containing fuel, which is highly resisting or durable to an alcohol-containing fuel so that the filtering efficiency of the filter can be maintained high for a long period of time even under a condition in which the filter is filled with the alcohol-containing fuel.

Another object of the present invention is to provide an improved plastisol type adhesive composition to be used in a filter for a methanol-containing fuel, which can maintain a high adhesive strength and cannot swell even upon being dipped in a methanol-containing fuel for a long time.

A further object of the present invention is to provide an improved plastisol type adhesive composition which is suitable for an adhesive for bonding a filter paper to a structural member(s) of a filter filled with a methanol-containing fuel.

A plastisol type adhesive composition of the present invention is to be used in a filter for filtering an alcohol-containing fuel. The adhesive composition comprises a polymer which contains polymerized vinyl chloride; a filler; a plasticizer; and phenolic resin as an adhesiveness providing agent.

Throughout a variety of studies of plastisol type adhesive compositions, the inventors have envisaged and completed the principle of the present invention upon paying attention to and having found the fact that a vinyl chloride plastisol blended with a specified adhesiveness providing agent does not make its swelling and peeling, exhibiting a high storage stability even upon being dipped in methanol for a long time. The plastisol type adhesive composition of the present invention is excellent in alcohol resistance and durable in an alcohol-containing fuel so as to maintain a high adhesive strength in the alcohol-containing fuel, as compared with conventional epoxy resin based adhesive and vinyl chloride plastisol type adhesive. Thus, the plastisol type adhesive composition of the present invention is very suitable for bonding and assembling component parts of a filter for filtering an alcohol-containing fuel, particularly a methanol-containing fuel.

DETAILED DESCRIPTION OF THE INVENTION

According to the present invention, a plastisol type adhesive composition (compound) used in a filter for an alcohol-containing fuel, comprising: a polymer which contains polymerized vinyl chloride; a filler; a plasticizer; and phenolic resin as an adhesiveness providing agent (or a bonding agent). The polymer which contains polymerized vinyl chloride is a vinyl chloride polymer or a copolymer of vinyl chloride and a monomer(s) other than vinyl chloride. The polymer may be a mixture containing vinyl chloride polymer and a copolymer of vinyl chloride and other mononer (s). The plastisol type adhesive composition optionally comprises epoxy resin.

The plastisol type adhesive composition is, for example, used to bond component parts of a filter element of the filter, during assembly of the element. This will be more specifically discussed with reference to FIG. 1.

Figure 1:
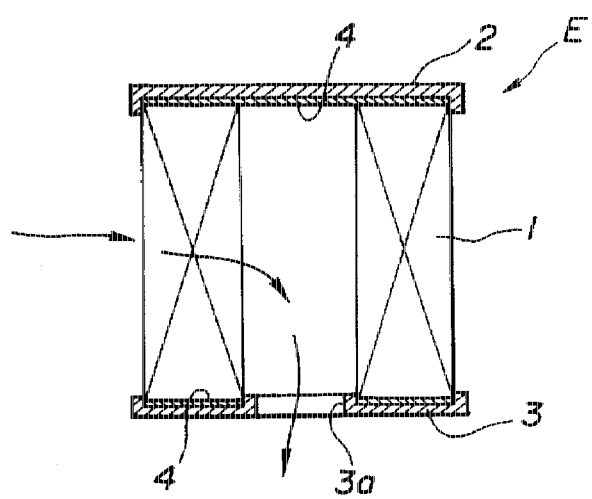
FIG. 1 is a schematic vertical sectional view of an example of a filter element of a fuel filter for filtering fuel of an automotive vehicle, in which a plastisol type adhesive composition of the present invention is used in the filter element.

As shown in FIG. 1, the filter usually comprises the filter element E which is disposed in a casing (not shown) maintaining a liquid tight seal therebetween. The filter element E includes a generally cylindrical filter paper 1 formed of a pleated filter paper. Upper and lower end caps 2, 3 are bonded respectively to the opposite ends of the cylindrical filter paper 1 with the plastisol type adhesive composition 4, 4. In other words, the plastisol type adhesive lies between each end cap 2 and the end of the cylindrical filter paper 1. In this case, the lower end cap is annular to form a central opening 3a, so that the alcohol-containing fuel flows from the outside of the filter element E through the filter paper 1 into the inside of the filter paper, and then is discharged through the central opening 3a of the end cap 3, as indicated by arrows in FIG. 1. When the fuel flows through the filer paper 1, impurities contained in the fuel is filtered. It will be understood that the term "alcohol-containing fuel" comprehends mere alcohol (methanol or ethanol), and a mixture of alcohol and gasoline.

The vinyl chloride polymer and the copolymer of the vinyl chloride and other monomer(s) are ones which are conventionally and generally used. Examples of the copolymer are ones which are prepared by copolymerization of vinyl chloride and vinyl monomer(s) other than vinyl chloride, such as vinyl acetate, maleic anhydride, maleic acid ester, and/or vinyl ether. The vinyl chloride polymer and the copolymer has a degree of polymerization ranging from 1000 to 1700. The vinyl chloride polymer and the copolymer are available on the market, for example, under the trade names of "Geon 121", "Geon 135J" and "Geon 103ZX" (produced by Nippon Zeon Co., Ltd.), "Denka Vinyl PA-100" (produced by Denki Kagaku Kogyo Kabushiki Kaisha), and "Kanevinyl PSL-10" and "Kanevinyl PSH-10" (produced by Kaneka Corporation).

As the filler in the plastisol type adhesive composition, a variety of usual filler materials are employed. Examples of the filler are calcium carbonate, talc, clay, barium sulfate, calcium oxide, and calcium hydroxide. The filler is contained, in the adhesive composition, in an amount ranging from 50 to 250 parts by weight relative to 100 parts by weight of the polymer which contains the polymerized vinyl chloride.

As the plasticizer in the plastisol type adhesive composition, one which is usually employed in a conventional vinyl chloride plastisol is used. Examples of the plasticizer are ester type plasticizers including phthalic acid ester such as dioctyl phthalate, dilauryl phthalate and distearyl phthalate, sebacic acid ester such as dioctyl sebacate, adipic acid ester such as dioctyl adipate, and phosphoric acid ester such as tricresyl phosphate. The content of the plasticizer in the adhesive composition is within a range from 50 to 250 parts by weight relative to 100 parts by weight of the polymer which contains the polymerized vinyl chloride.

As the phenolic resin as the adhesiveness providing agent in the plastisol type adhesive composition, novolak type phenolic resin and/or resol type phenolic resin are used. Such phenolic resin is available on the market under the trade name of "Resitop PG-2411" (produced by Gunei Chemical Industry Co., Ltd.), "Sumilite Resin PR-12678" (produced by Sumitomo Durez Company Ltd.), and "Shonol BRP-8260" and "Shonol BRP-441" (produced by Showa Highpolymer Co., Ltd.). It is preferable that the content of the phenolic resin is 0.5 to 20 parts by weight relative to 100 parts by weight of the polymer which contains the polymerized vinyl chloride (i.e., the vinyl chloride polymer or the copolymer of vinyl chloride and other monomer(s)). If the content is less than 0.5 parts by weight, a methanol resistance of the plastisol type adhesive is low. If the content exceeds 20 parts by weight, operational efficiency for applying the adhesive composition is degraded because a so-called thixotropic index is lowered. In this case, meant by "thixotropic index" is a ratio in viscosity, represented by V2/V20 where V2 is a viscosity at 2 r.p.m. in a rotational viscometer; and V20 is a viscosity at 20 r.p.m. in the rotational viscometer.

The resol type phenolic resin hardens under condensation reaction upon being heated. The novolak type phenol resin hardens under condensation reaction upon being heated in the presence of hexamethylene tetramine. Thus, the phenolic resins can provide a rigid adhesion characteristics to the adhesive composition. In presence of epoxy resin in the adhesive composition, epoxy group reacts with hydroxyl group of phenolic resin upon heating, so that a further rigid adhesion characteristics of the adhesive composition can be obtained. Metallic soap and/or organotin compound may be added to the adhesive composition in order to thermally stabilize the adhesive composition.

The epoxy resin used in the adhesive composition is not limited to particular ones. The epoxy resin generally contains two or more epoxy groups in a molecule. Examples of such epoxy resin are a reaction product of epichlorohydrin and 2, 2-bis (4-hydroxyphenyl) propane (bisphenol A), a derivative of aliphatic polyglycidyl ether of polyhydric alcohol, a reaction product of resorcinol, diphenol-poly-(hydroxyphenyl)pentadecane and epichlorohydrin, and one (novolak type) produced under epoxidation of novolak compound. The content of the epoxy resin in the adhesive composition is within a range from 0 to 15 parts by weight relative to 100 parts by weight of the polymer which contains the polymerized vinyl chloride.

As will be appreciated from the above, the phenolic resin largely improves the resistance or durability of the plastisol type adhesive composition to a methanol-containing fuel. The epoxy resin further improves the same resistance or durability of the adhesive composition.

To further illustrate this invention, and not by way of limitation, Examples and Comparative Examples will be discussed with reference to Table 1.

EXAMPLE 1

Vinyl chloride polymer (the trade name "Geon 121" produced by Nippon Zeon Co., Ltd.) in an amount of 100 parts by weight, 100 parts by weight of calcium carbonate ( the trade name "Whiton SB" produced by Shiraishi Calcium Kaisha Ltd.), 1.5 parts by weight of phenolic resin (the trade name "PG-2411" produced by Gunei Chemical Industry Co., Ltd.) as an adhesiveness providing agent, and 1 part by weight of dibutyltin dilaurate were mixed with 120 parts by weight of dioctyl phthalate (referred hereinafter to as D.O.P) to form a mixture. Stirring was made on the mixture, in which defoaming was made under vacuum. Thus, a plastisol type adhesive composition having a high viscosity was obtained and had a viscosity of 20000 cps/30° C. and a thixotropic index of 1.8.

EXAMPLE 2

Vinyl chloride polymer (the trade name "Geon 121" produced by Nippon Zeon Co., Ltd. ) in an amount of 100 parts by weight, 100 parts by weight of calcium carbonate (the trade name "Whiton SB" produced by Shiraishi Calcium Kaisha Ltd. ), 15 parts by weight of phenolic resin (the trade name "PG-2411" produced by Gunei Chemical Industry Co., Ltd. ) as an adhesiveness providing agent, and 1 part by weight of dibutyltin dilaurate were mixed with 120 parts by weight of D.O.P (dioctyl phthalate) to form a mixture. Stirring was made on the mixture, in which defoming was made under vacuum. Thus, a plastisol type adhesive composition having a high viscosity was obtained and had a viscosity of 23000 cps/30° C. and a thixotropic index of 1.6.

EXAMPLE 3

Vinyl chloride polymer (the trade name "Geon 121" produced by Nippon Zeon Co., Ltd.) in an amount of 100 parts by weight, 100 parts by weight of calcium carbonate (the trade name "Whiton SB" produced by Shiraishi Calcium Kaisha Ltd.), 10 parts by weight of phenolic resin (PG-2411 produced by Gunei Chemical Industry Co., Ltd.) as an adhesiveness providing agent and 10 parts by weight of epoxy resin (the trade name "Epon 828" produced by Yuka Shell Epoxy Kabushiki Kaisha) were mixed with 120 parts by weight of D.O.P (dioctyl phthalate) to form a mixture. Stirring was made on the mixture, in which defoaming was made under vacuum. Thus, a plastisol type adhesive composition having a high viscosity was obtained and has a viscosity of 18000 cps/30° C. and a thixotropic index of 2.4.

COMPARATIVE EXAMPLE 1

Vinyl chloride polymer (the trade name "Geon 121" produced by Nippon Zeon Co., Ltd.) in an amount of 100 parts by weight, 100 parts by weight of calcium carbonate (the trade name "Whiton SB" produced by Shiraishi Calcium Kaisha Ltd.), 10 parts by weight of epoxy resin (the trade name "Epon 828" produced by Yuka Shell Epoxy Kabushiki Kaisha) as an adhesive providing agent, and 3 parts by weight of dicyane diamide (as a latent curing agent for the epoxy resin) were mixed with 120 parts by weight of D.O.P (dioctyl phthalate) to form a mixture. Stirring was made on the mixture, in which defoaming was made under vacuum. Thus, a plastisol type adhesive composition having a high viscosity was obtained and had a viscosity of 25000 cps/30° C. and a thixotropic index of 2.5.

COMPARATIVE EXAMPLE 2

Vinyl chloride polymer (the trade name "Geon 121" produced by Nippon Zeon Co., Ltd.) in an amount of 100 parts by weight, 100 parts by weight of calcium carbonate (the trade name "Whiton SB" produced by Shiraishi Calcium Kaisha Ltd.), 10 parts by weight of epoxy resin (the trade name "Epon 828" produced by Yuka Shell Epoxy Kabushiki Kaisha) as an adhesive providing agent, and 10 parts by weight of carboxylated vinyl chloride-vinyl acetate copolymer (the trade name "Geon 121" 400x110A produced by Nippon Zeon Co., Ltd.) were solved in D.O.P to form a 20% solution. The solution was mixed with 120 parts by weight of D.O.P (dioctyl phthalate) to form a mixture. Stirring was made on the mixture, in which defoaming was made under vacuum. Thus, a plastisol type adhesive composition having a high viscosity was obtained and had a viscosity of 25000 cps/30° C. and a thixotropic index of 2.0.

COMPARATIVE EXAMPLE 3

Vinyl chloride polymer (the trade name "Geon 121" produced by Nippon Zeon Co., Ltd.) in an amount of 100 parts by weight, 100 parts by weight of calcium carbonate (the trade name "Whiton SB" produced by Shiraishi Calcium Kaisha Ltd.), 10 parts by weight of epoxy resin (the trade name "Epon 828" produced by Yuka Shell Epoxy Kabushiki Kaisha) as an adhesive providing agent, and 2 parts by weight of silane coupling agent (the trade name "A-1100" produced by Nippon Unicar Co., Ltd.) were mixed with 120 parts by weight of D.O.P (dioctyl phthalate) to form a mixture. Stirring was made on the mixture, in which defoaming was made under vacuum. Thus, a plastisol type adhesive composition having a high viscosity was obtained and had a viscosity of 25000 cps/30° C. and a thixotropic index of

COMPARATIVE EXAMPLE 4

Vinyl chloride polymer (the trade name "Geon 121" produced by Nippon Zeon Co., Ltd.) in an amount of 100 parts by weight, 100 parts by weight of calcium carbonate (the trade name "Whiton SB" produced by Shiraishi Calcium Kaisha Ltd.), 10 parts by weight of carboxylated vinyl chloride-vinyl acetate copolymer (the trade name "Geon 400x110A" produced by Nippon Zeon Co., Ltd.) as an adhesiveness providing agent, 3 parts by weight of blocked isocyanate compound (the trade name "AP STABLE-M" produced by Nippon Polyurethane Industry Co., Ltd.), and 1 part by weight of dibutyltin dilaurate were mixed with 120 parts by weight of D.O.P (dioctyl phthalate) to form a mixture. Stirring was made on the mixture, in which defoaming was made under vacuum. Thus, a plastisol type adhesive composition having a high viscosity was obtained and had a viscosity of 22000 cps/30° C. and a thixotropic index of 2.0.

In connection with the above, Table 1 shows the contents of respective components in part(s) by weight of the adhesive compositions of Examples 1 to 3 and Comparative Examples 1 to 4 which were prepared in manners as discussed above.

TABLE 1

| Component | Example | | | Comparative Example | | | |
|---|---|---|---|---|---|---|---|
| | 1 | 2 | 3 | 1 | 2 | 3 | 4 |
| Vinyl chloride polymer | 100 | 100 | 100 | 100 | 100 | 100 | 100 |
| Calcium Carbonate | 100 | 100 | 100 | 100 | 100 | 100 | 100 |
| Epoxy resin | — | — | 10 | 10 | 10 | 10 | — |
| Latent curing agent | — | — | — | 3 | — | — | — |
| Carboxylated vinyl chloride-vinyl acetate copolymer | — | — | — | — | 10 | — | 10 |
| Silane coupling agent | — | — | — | — | — | 2 | — |
| Blocked isocyanate compound | — | — | — | — | — | — | 3 |
| Phenolic resin | 1.5 | 15 | 10 | — | — | — | — |
| Dioctyl phthalate | 120 | 120 | 120 | 120 | 120 | 120 | 120 |
| Dibutyltin dilaurate | 1 | 1 | — | — | — | — | 1 |

[NOTE]:
Content is represented by "part(s) by weight".

Tests were conducted on the adhesive compositions of Examples 1 to 3 and Comparative Examples 1 to 4, and on a conventional epoxy resin based adhesive composition (indicated as "Conv. Ad. Comp." in Table 2) in order to evaluate the performance of the adhesive compositions of the present invention. The tests were made as follows:

First, two kinds of specimens for tests were prepared by using each adhesive composition of Examples and Comparative Examples. Additionally, for the comparison purpose, further two kinds of specimens for tests were prepared by using the conventional epoxy resin based adhesive composition which comprised 25 parts by weight of a main ingredient (bisphenol F), 25 parts by weight of a hardener (polyamide amine), and 50 parts by weight of filler (calcium carbonate) and the like.

Of the above various specimens, one kind was 10 specimens for measuring "peel strength (a resisting strength against a peeling force)", the other kind 10 specimens for measuring "shearing strength". The "peel strength (kg/25 mm)" was measured according to JIS (Japanese Industrial Standard) K6854-1977. The "shearing strength (kg/cm)" was measured under an increasing pulling stress, according to JIS K6850-1976.

The above two kinds of specimens were heated at a predetermined temperature to cure the employed adhesive compositions. Five specimens of each kind were subjected to the "peel strength" measurement whereas other five specimens were subjected to the "shearing strength" measurement. The results of the measurements were recorded to obtain an average value (of five measured values) as a "peel strength before fuel-dipping" though not shown. Thereafter, five specimens of each kind were dipped in an alcohol-containing fuel (so-called "fuel M85" consisting of 85 vol % of methanol and 15 vol % of gasoline) at 65° C. for 500 hours. Then, the specimens were subjected to the "peel strength" measurement and the "shearing strength" measurement. The results of these measurements were recorded to obtain an average value (of five measured values) shown as a "peel strength after fuel-dipping" and a "tensile strength after fuel-dipping" in Table 2. Concerning "peel strength", a "performance retention rate (%)" was calculated and recorded as shown in Table 2, in which the "performance retention rate (%)" was calculated by [("peel strength after fuel-dipping"/"peel strength before fuel-dipping")×100]. Also concerning "shearing strength", a "performance retention rate (%)" was calculated and recorded as shown in Table 2, in which the "performance retention rate (%)" was calculated by [("shearing strength after fuel-dipping"/"shearing strength before fuel-dipping")×100]. Additionally, during the "shearing strength" measurement, observation was made as to whether peeling (between the adhesive composition and a metal sheet forming part of each specimen) occurred or not at a load of 4 kg/25 mm. The results of the observation were recorded and shown as "peeling in shearing strength measurement" in Table 2.

composition was lowered in thixotropic index below a predetermined value below which a suitable operational efficiency was not obtained.

Figure 2:
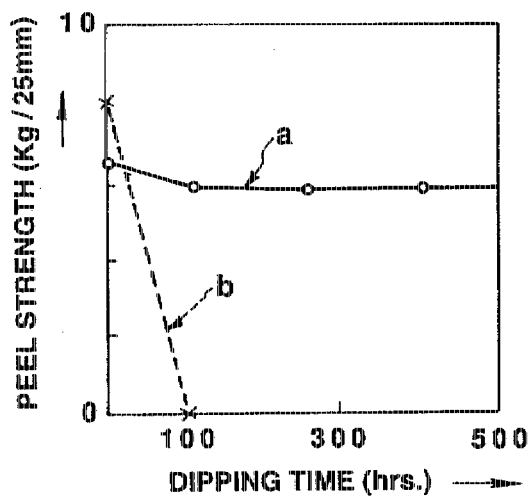
FIG. 2 is a graph showing the relationship between a peel strength and a dipping time, for a plastisol type adhesive composition of the present invention and a conventional adhesive.
Figure 3:
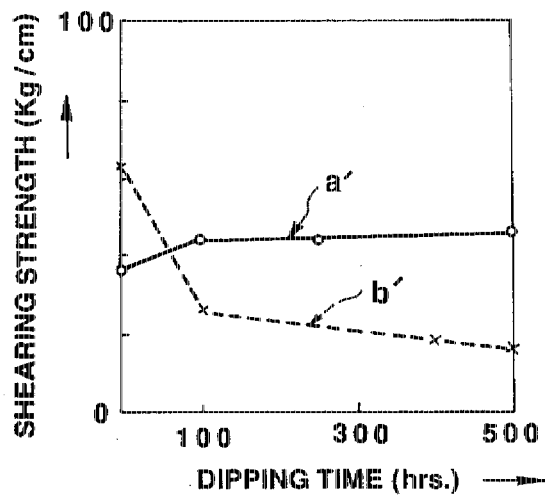
FIG. 3 is a graph showing the relationship between a tensile strength and a dipping time, for the plastisol type adhesive composition of the present invention and the conventional adhesive.

Further comparative tests were conducted on the adhesive composition of Example 3 and the above-mentioned conventional epoxy resin based adhesive composition. In the tests, specimens for measurement of the "peel strength" and other specimens for measurement of the "shearing strength" were dipped in the above-mentioned alcohol-containing fuel for a time ranging from 0 to 500 hours, thus changing a dipping time of the specimens. Upon lapse of a predetermined dipping time, the specimens were subjected to the "peel strength" measurement and the "shearing strength" measurement thereby obtaining the results shown in FIGS. 2 and 3. In FIGS. 2 and 3, lines a and a' represent the results of the adhesive composition of Example 3 whereas lines b and b' represent the results of the conventional epoxy resin based adhesive composition. The tests reveal that the adhesive composition of Example 3 maintain its high performance in an alcohol-containing fuel even upon lapse of a long time, particularly as compared with the conventional epoxy resin based adhesive composition.

What is claimed is:

1. A method of improving the adhesion to a metal of a plastisol adhesive when exposed to alcohol containing fuel, comprising the steps of:

applying a plastisol adhesive composition to at least one of a filter medium and a support medium, said adhesive comprises polymerized vinyl chloride, a plasticizer, and a phenolic resin as an adhesiveness promoting agent;

TABLE 2

| Item | Example | | | Conv. Ad. Comp. | Comparative Example | | | |
|---|---|---|---|---|---|---|---|---|
| | 1 | 2 | 3 | | 1 | 2 | 3 | 4 |
| Peel strength (kg/25 mm) (After fuel-dipping) | 4.6 | 4.8 | 6.5 | 0[a] | 3.6 | 3.0 | 2.4 | 2.2 |
| Performance retention rate (%) in peel strength | 68 | 71 | 96 | — | 53 | 44 | 35 | 32 |
| Shearing strength (kg/cm) (After fuel-dipping) | 28 | 38 | 45 | 17 | 20 | 20 | 15 | 15 |
| Performance retention rate (%) in shearing strength | 112 | 152 | 180 | 68 | 80 | 80 | 60 | 60 |
| Peeling in shearing strength measurement | Nil | Nil | Nil | — | Occurred | Occurred | Occurred | Occurred |

Note:
[a]Natural peeling occurred at a dipping time of 100 hrs.

The above test results reveal that the adhesive compositions of Examples are excellent in performance as compared with those of Comparative Examples and with the conventional epoxy resin based adhesive composition, in which the adhesive composition of Example 3 is particularly excellent as compared with ones of Examples 1 and 2. Though not discussed in detail here, the same tests as discussed above were conducted also on an adhesive composition which was the same as that of Example 1 with exception that the content of phenol resin was less than 0.5 part by weight relative to 100 parts by weight of the polymer containing polymerized vinyl chloride, and on an adhesive composition which was the same as that of Example 1 with exception that the content of phenol resin was more than 20 parts by weight relative to 100 parts by weight of the polymer. The former adhesive composition had average values (in "peel strength" and "shearing strength") similar to those of the adhesive compositions of Comparative Examples. The latter adhesive bonding said filter element and said support medium; and curing said adhesive to thereby form a fuel filter having improved resistance to alcohol containing fuel.

2. A method as claimed in claim 1, further comprising contacting the fuel filter with an alcohol containing fuel.

3. A method as claimed in claim 1, wherein the polymer is present in an amount of 100 parts by weight, the plasticizer is present in an amount ranging from 50 to 250 parts by weight, and the phenolic resin is present in an amount ranging from 0.5 to 20 parts by weight.

4. A method as claimed in claim 1, further comprising a filler in an amount ranging from 50 to 250 parts by weight relative to 100 parts by weight of said polymer.

5. A method as claimed in claim 1, wherein said polymer is selected from the group consisting of a vinyl chloride polymer, a copolymer of vinyl chloride and a monomer other than vinyl chloride and a mixture thereof, and said plasticizer is selected from the group consisting of dioctyl phthalate, dilauryl phthalate, distearyl phthalate, dioctyl sebacate, dioctyl adipate, tricresyl phosphate and a mixture thereof.

6. A method as claimed in claim 4, wherein said filler is selected from the group consisting of calcium carbonate, talc, clay, barium sulfate, calcium oxide, calcium hydroxide and a mixture thereof.

7. A method as claimed in claim 4, wherein said adhesive further comprises epoxy resin.

8. A method as claimed in claim 7, wherein said epoxy resin is present in an amount ranging from 0 to 15 parts by weight relative to 100 parts by weight of said polymer.

9. A method as claimed in claim 7, wherein said epoxy resin is one selected from the group consisting of a reaction product of epichlorohydrin and 2, 2-bis (4-hydroxyphenyl) propane (bisphenol A), a derivative of aliphatic polyglycidyl ether of polyhydric alcohol, a reaction product of resorcinol, diphenol-poly-(hydroxyphenyl)-pentadecane and epichlorohydrin, and a product (novolak type) formed under epoxidation of a novolak compound.

10. A method of improving the useful life of a fuel filter when exposed to an alcohol containing fuel, comprising the steps of applying a plastisol adhesive composition to at least one of a filter medium and a support medium, said adhesive comprises polymerized vinyl chloride, a plasticizer, and a phenolic resin as an adhesiveness promoting agent;

bonding said filter element and said support medium; and curing said adhesive to thereby form a fuel filter having improved resistance to alcohol containing fuel.

11. A method as claimed in claim 10, further comprising contacting the fuel filter with an alcohol containing fuel.

12. A method as claimed in claim 10, wherein the polymer is present in an amount of 100 parts by weight, the plasticizer is present in an amount ranging from 50 to 250 parts by weight, and the phenolic resin is present in an amount ranging from 0.5 to 20 parts by weight.

13. A method as claimed in claim 10, further comprising a filler in an amount ranging from 50 to 250 parts by weight relative to 100 parts by weight of said polymer.

14. A method as claimed in claim 10, wherein said polymer is selected from the group consisting of a vinyl chloride polymer, a copolymer of vinyl chloride and a monomer other than vinyl chloride and a mixture thereof, and said plasticizer is selected from the group consisting of dioctyl phthalate, dilauryl phthalate, distearyl phthalate, dioctyl sebacate, dioctyl adipate, tricresyl phosphate and a mixture thereof.

15. A method as claimed in claim 13, wherein said filler is selected from the group consisting of calcium carbonate, talc, clay, barium sulfate, calcium oxide, calcium hydroxide and a mixture thereof.

16. A method as claimed in claim 10, wherein said adhesive further comprises epoxy resin.

17. A method as claimed in claim 16, wherein said epoxy resin is present in an amount ranging from 0 to 15 parts by weight relative to 100 parts by weight of said polymer.

18. A method as claimed in claim 16, wherein said epoxy resin is one selected from the group consisting of a reaction product of epichlorohydrin and 2, 2-bis (4-hydroxyphenyl) propane (bisphenol A), a derivative of aliphatic polyglycidyl ether of polyhydric alcohol, a reaction product of resorcinol, diphenol-poly-(hydroxyphenyl)pentadecane and epichlorohydrin, and a product (novolak type) formed under epoxidation of a novolak compound.

\* \* \* \* \*